US009652676B1

(12) United States Patent
Dey et al.

(10) Patent No.: US 9,652,676 B1
(45) Date of Patent: May 16, 2017

(54) VIDEO PERSONALIZING SYSTEM, METHOD, AND RECORDING MEDIUM

(71) Applicant: International Business Machines Corporation, Armonk, NY (US)

(72) Inventors: Kuntal Dey, New Delhi (IN); Seema Nagar, Bangalore (IN); Roman Vaculin, Bronxville, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/976,841

(22) Filed: Dec. 21, 2015

(51) Int. Cl.
*H04N 9/80* (2006.01)
*G06K 9/00* (2006.01)
*G11B 27/031* (2006.01)
*G06Q 30/02* (2012.01)

(52) U.S. Cl.
CPC ....... *G06K 9/00744* (2013.01); *G06K 9/0061* (2013.01); *G06K 9/00268* (2013.01); *G06K 9/00302* (2013.01); *G06K 9/00758* (2013.01); *G06K 9/00892* (2013.01); *G06Q 30/0269* (2013.01); *G11B 27/031* (2013.01)

(58) Field of Classification Search
CPC .......... G06K 9/00744; G06K 9/00268; G11B 27/031
USPC ...... 386/200, 239–241, 248; 725/12, 13, 18, 725/40, 45, 46, 48, 53, 10, 44; 715/716, 715/719
See application file for complete search history.

(56) References Cited

U.S. PATENT DOCUMENTS

| 7,757,171 B1* | 7/2010 | Wong | G06F 17/30053 345/156 |
| 2003/0236582 A1* | 12/2003 | Zamir | G11B 27/002 700/94 |
| 2011/0107215 A1* | 5/2011 | Klappert | G06F 3/167 715/716 |
| 2013/0290847 A1* | 10/2013 | Hooven | G06F 17/30899 715/719 |
| 2014/0086554 A1* | 3/2014 | Yehezkel | H04N 21/251 386/241 |
| 2014/0137144 A1* | 5/2014 | Jarvenpaa | H04N 21/4667 725/13 |

(Continued)

*Primary Examiner* — Thai Tran
*Assistant Examiner* — Mishawn Hunter
(74) *Attorney, Agent, or Firm* — Alexa L. Ashworth, Esq.; McGinn IP Law Group, PLLC

(57) ABSTRACT

A video personalizing method, system, and non-transitory computer readable medium receiving user information for a viewer watching a first video, includes a biometric analyzing device configured to analyze the user information for biometric data, a viewer content analyzing device configured to analyze the user information for online content generated by the viewer in parallel to watching the first video, an expression analyzing device configured to analyze the user information for facial and eye reactions of the viewer, a text analyzing device configured to analyze the user information for text that the viewer reads, and a video selection device configured to select a second video out of a plurality of videos stored in a video storing unit in order to increase a satisfaction of the viewer based on the collective outputs the biometric analyzing device, the viewer content analyzing device, the expression analyzing device, and the text analyzing device.

19 Claims, 5 Drawing Sheets

(56) References Cited

U.S. PATENT DOCUMENTS

| | | | |
|---|---|---|---|
| 2014/0282661 A1* | 9/2014 | Martin | H04N 21/23418 725/18 |
| 2015/0020106 A1* | 1/2015 | Belyaev | H04N 21/4622 725/45 |
| 2015/0070516 A1* | 3/2015 | Shoemake | H04N 21/42203 348/207.11 |
| 2015/0082349 A1* | 3/2015 | Ishtiaq | H04N 21/23418 725/40 |
| 2015/0110471 A1* | 4/2015 | Zheng | H04N 5/76 386/291 |
| 2015/0347903 A1* | 12/2015 | Saxena | G06T 11/206 706/11 |
| 2015/0350730 A1* | 12/2015 | el Kaliouby | A61B 5/165 725/12 |
| 2015/0365725 A1* | 12/2015 | Belyaev | H04N 21/458 725/46 |

* cited by examiner

VIDEO PERSONALIZING SYSTEM, METHOD, AND RECORDING MEDIUM

BACKGROUND

The present invention relates generally to a video personalizing system, and more particularly, but not by way of limitation, to a video personalizing system for a viewer's active and passive reaction-based video branching/video template instantiation, adaptation and personalization in soft real-time where the viewer, while watching a video, generates or consumes content (e.g., on social media) that is related to the content of the video.

Conventionally, video branching has been done, personalizing template videos has been explored, instantiating videos in soft real time, on need basis, has been explored in literature, and eye tracking and social media content analytics, both exist independently. However, each of these exists independently and has never been considered for combination.

That is, the conventional techniques are not used in combination and thus the conventional techniques fail to: (1) actively monitor viewer reaction and perception to a given video, over time, for purpose of adapting or personalizing the video as it moves forward; (2) actively monitor the content generated by a given viewer on social media while the video is going on, analyze the mood (based upon physiological parameters) and perception (based upon eye movements and facial expressions) of the viewer, and thereby adapt or personalize the video on the fly using video branching techniques; (3) actively track the (related and other) content read by a given viewer on the web or social media (using eye tracking methods), and analyze the viewer's reaction to reading the content (happy, angry, confused etc.), with respect to the nature of the content (funny, thought-provoking etc.), including content directly about the topic being shown currently in the video; and (4) branch, adapt and personalize the shown video on a continuous basis, from a given set of options or by filling in a video template, on-the-fly, based upon the inferred mood and quantum/degree of reception of the presented content by the viewer.

Thus, there is a technical problem in the conventional techniques that the techniques are incapable of providing a video personalizing system that can branch videos, by creating a video from a given set of video-snippets or by generating video-snippets dynamically in soft real time from given templates, based upon a profile derived using viewer's direct participation (writing) on social media, passively inferred interests/disinterests by their current and general online/digital reading behavior, biological parameters such as mood swing (found using wearables looking into physiological parameters), facial reactions (and their evolutions) and eye movement patterns within the current video with the specific analytics, metrics, and assessment based on the video content and expected outcomes.

SUMMARY

In an exemplary embodiment, the present invention can provide a video personalizing system receiving user information for a viewer watching a first video, including a biometric analyzing device configured to analyze the user information for biometric data, a viewer content analyzing device configured to analyze the user information for online content generated by the viewer in parallel to watching the first video, an expression analyzing device configured to analyze the user information for facial and eye reactions of the viewer, a text analyzing device configured to analyze the user information for text that the viewer reads, and a video selection device configured to select a second video out of a plurality of videos stored in a video storing unit in order to increase a satisfaction of the viewer based on the collective outputs the biometric analyzing device, the viewer content analyzing device, the expression analyzing device, and the text analyzing device.

Further, in another exemplary embodiment, the present invention can provide a non-transitory computer-readable recording medium recording a video personalizing program receiving user information for a viewer watching a first video, the program causing a computer to perform: analyzing the user information for biometric data, analyzing the user information for online content generated by the viewer in parallel to watching the first video, analyzing the user information for facial and eye reactions of the viewer, analyzing the user information for text that the viewer reads, and selecting a second video out of a plurality of videos stored in a video storing unit in order to increase a satisfaction of the viewer based on the collective outputs of each of the analyzing.

Even further, in another exemplary embodiment, the present invention can provide a video personalizing method receiving user information for a viewer watching a first video, the method including analyzing the user information for biometric data, analyzing the user information for online content generated by the viewer in parallel to watching the first video, analyzing the user information for facial and eye reactions of the viewer, analyzing the user information for text that the viewer reads, and selecting a second video out of a plurality of videos stored in a video storing unit in order to increase a satisfaction of the viewer based on the collective outputs of each of the analyzing.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
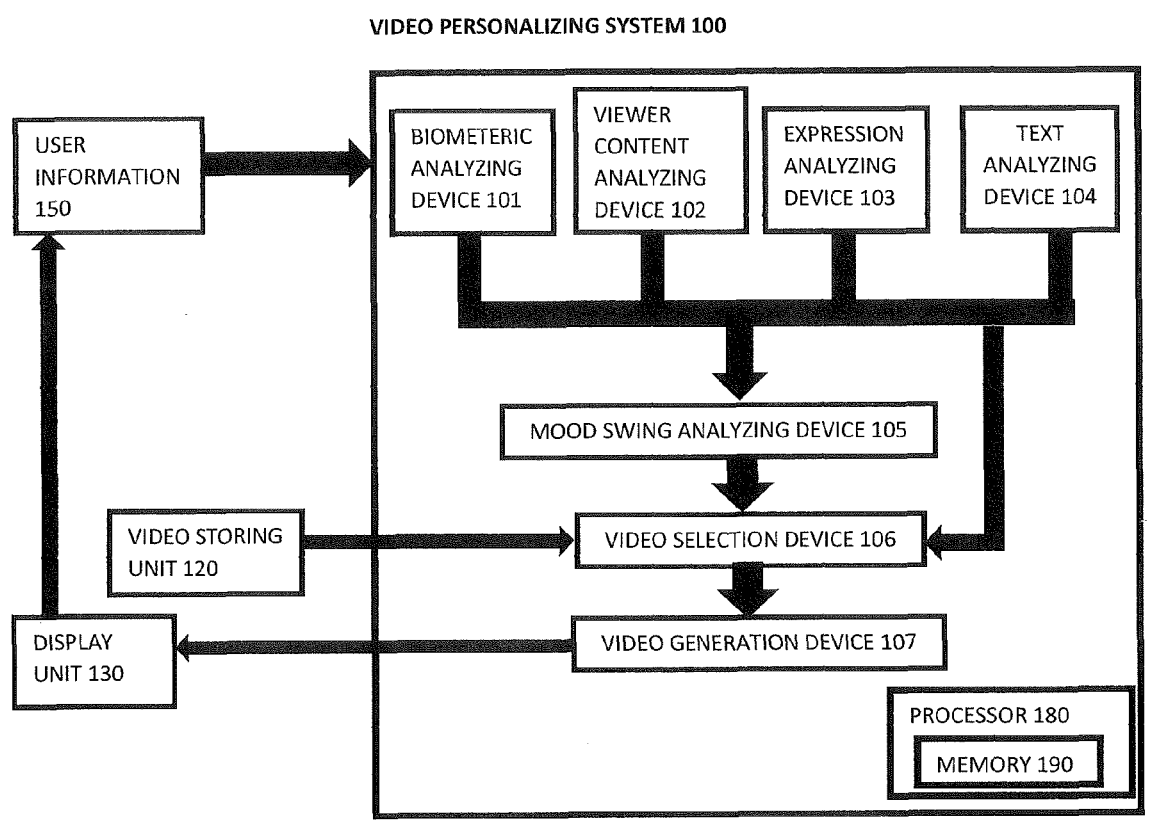
FIG. 1 exemplarily shows a block diagram illustrating a configuration of a video personalizing system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the video personalizing system 100 includes a biometric analyzing device 101, a viewer content analyzing device 102, an expression analyzing device 103, a text analyzing device 104, a mood swing analyzing device 105, a video selection device 106, and a video generation device 107. The video personalizing system 100 includes a processor 180 and a memory 190, with the memory 190 storing instructions to cause the processor 180 to execute each device of video personalizing system 100.

Although the video personalizing system 100 includes various devices, it should be noted that a video personalizing system can include modules in which the memory 190 stores instructions to cause the processor 180 to execute each module of video personalizing system 100.

With the use of these various devices, the video personalizing system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
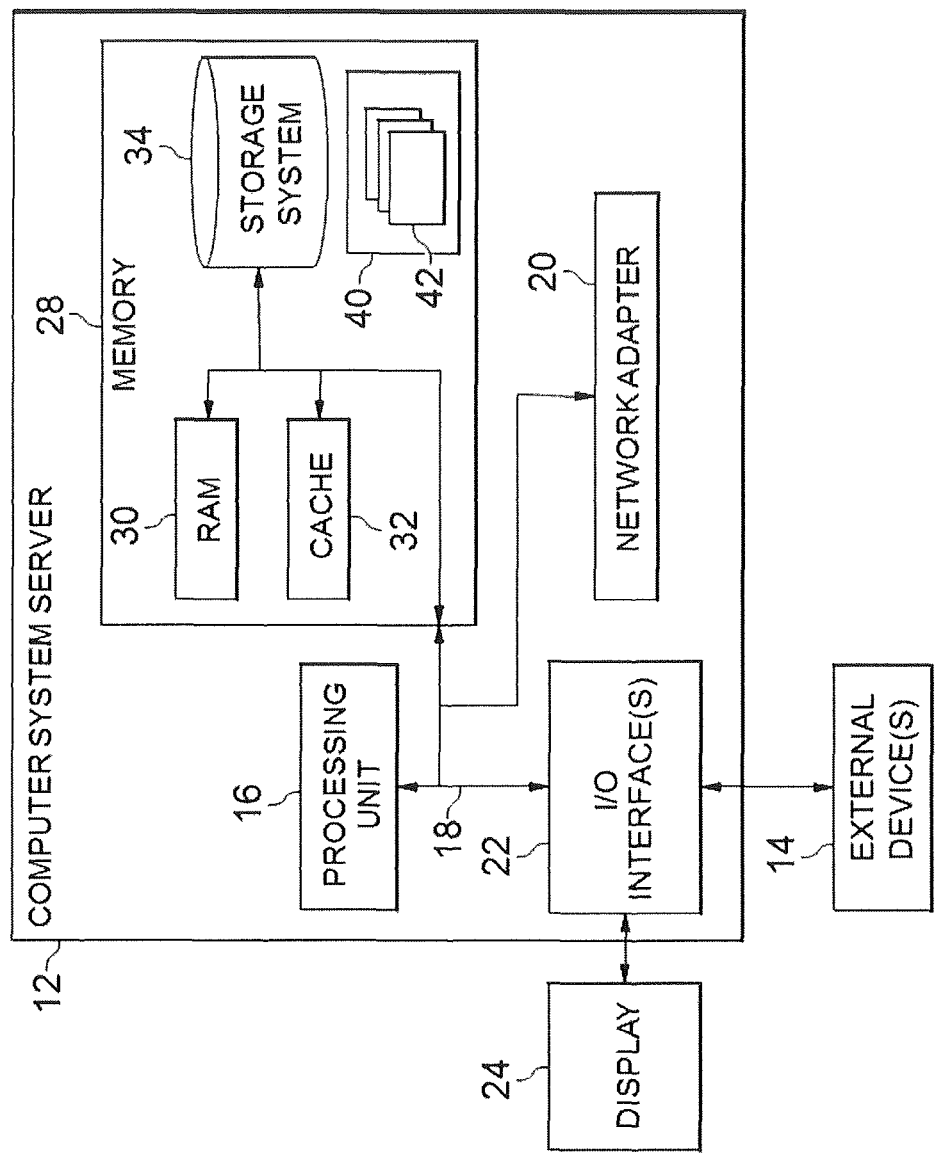
FIG. 3 depicts a cloud computing node according to an embodiment of the present invention.
Figure 4:
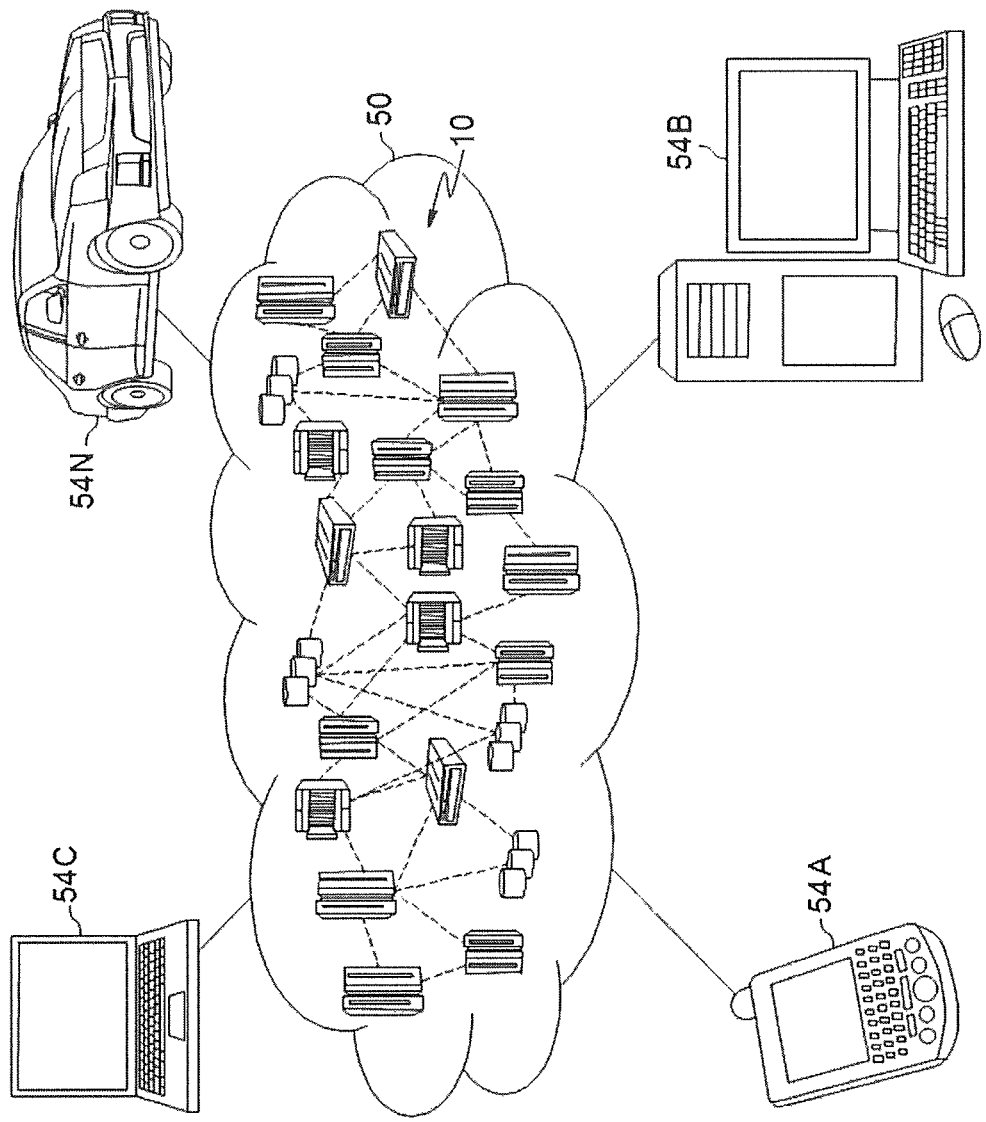
FIG. 4 depicts a cloud computing environment according to another embodiment of the present invention.
Figure 5:
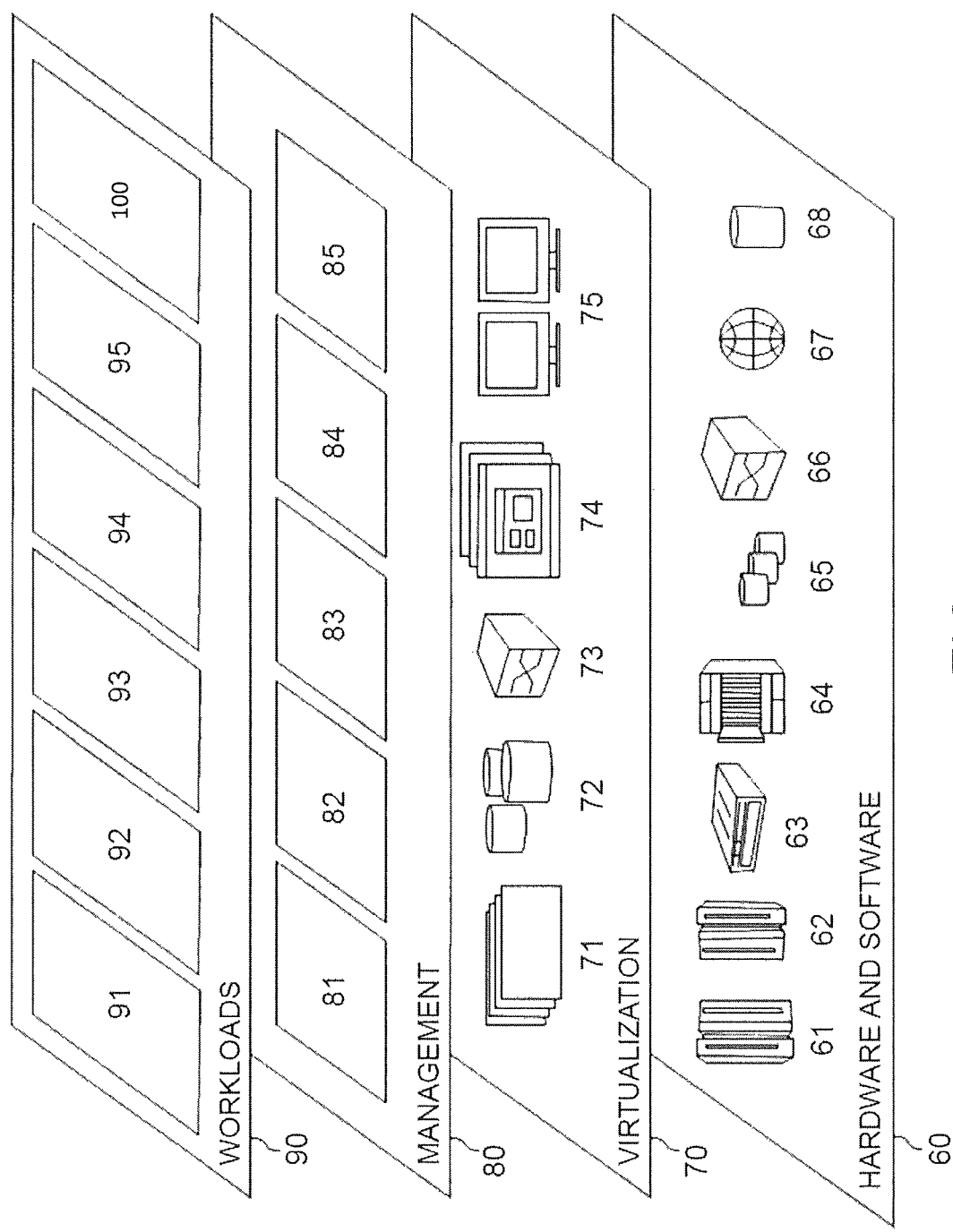
FIG. 5 depicts abstraction model layers according to an embodiment of the present invention.

Although as shown in FIGS. 3-5 and as described later, the computer system/server 12 is exemplarily shown in cloud computing node 10 as a general-purpose computing device which may execute in a layer the video personalizing system 100 (FIG. 5), it is noted that the present invention can be implemented outside of the cloud environment.

The video personalizing system 100 receives user information 150 which is based on the viewer watching a video on the display unit 130. The user information 150 includes viewer-generated content collected via social media platforms, such as Twitter™, Facebook™, etc. Further, the user information 150 can be collected by the user wearing "wearables" including glasses to detect user information 150 such as eye focus, rings, shoes etc. in order to monitor other biometric parameters such as heart beat rate, breathing rate, blood flow rate, etc. Also, user information 150 includes gaze detection data for which words of a screen the user's eyes are focusing on is detected by eye tracking technologies that can track eye movements, such as mobile phone camera, a webcam etc., and software that takes care of the eye tracking program stack including gaze detection for words (fixation, saccade, regression, scan path etc.) User information 150 also includes facial expressions found by a face detector, a face point identifier (nose, lips etc. identifications) and a face-based mood inference subsystem that can detect facial expressions.

The biometric analyzing device 101 analyzes the user information 150 for the viewer's focus levels, facial reactions and mood swings while watching a video, as detected by the TV set/set top box/video watching device and wearables such as rings, watches and glasses.

The viewer content analyzing device 102 analyzes the user information 150 of the online content generated by the viewer of a given initial video clip in parallel to watching the video on the display unit 130 while the viewer watches the current video. The viewer content analyzing device 102 focuses the analysis on the observations determined by current content and expected outcomes.

The viewer content analyzing device 102 actively monitors the content generated by a given viewer on social media while the video is playing, analyzes the mood (based upon physiological parameters) and perception (based upon eye movements and facial expressions) of the viewer, and thereby adapt or personalize the video on the fly using video branching techniques.

The expression analyzing device 103 analyzes the user information 150 for the viewer's facial and eye-related reaction to the initial video clip, the content consumed and the content produced.

Thus, the expression analyzing device 103 actively monitors viewer reaction and perception to a given video, over time, for purpose of adapting or personalizing the video as it moves forward with focus of the analysis determined by the video content and expected outcomes based on facial expressions and/or eye-related reactions of the user.

The text analyzing device 104 analyzes the user information 150 for the text that the viewer reads or elated content online via her smart phone, tablet, computer etc., then the text analyzing device 104 infers the user's positive and negative reactions from eye movements and facial expressions, and matching that with the nature of the content that the user is reading.

The text analyzing device 104 actively tracks the content read by a given viewer on the web or social media using eye tracking methods, and analyzes the viewer's reaction to reading the content (i.e., happy, angry, confused, etc.), with respect to the nature of the content (i.e., funny, thought-provoking etc.), including content directly about the topic being shown currently in the video. For example, a user should not be angry while watching funny content. The text analyzing device 104 tracks the reactions.

Thus, the biometric analyzing device 101, the viewer content analyzing device 102, the expression analyzing device 103, and the text analyzing device 104 collectively monitor viewer reaction and perception to a given video, over time, for purpose of adapting or personalizing the video as it moves forward.

The mood swing analyzing device 105 receives all of the outputs from the biometric analyzing device 101, the viewer content analyzing device 102, the expression analyzing device 103, and the text analyzing device 104 and analyzes the change in mood of the viewer over time. For example, the user can initially be happy during a first period of a first clip and then change to being mad by an end of the first clip. The mood swing analyzing device 105 tracks the changes in mood of the viewer.

The video selection device 106 determines the genre/labels/mood associated with the set of content (i.e., associated with the video) with the most favorable user reaction. For example, the video selection device 106 determines if the video is a comedy, a horror film, or a contest show and associates a reaction of happy, scared, or entertained, respectively, as the type of reaction that a user should have with that video.

Thus, based on the collective output of the biometric analyzing device 101, the viewer content analyzing device 102, the expression analyzing device 103, and the text analyzing device 104, the video selection device 106 selects a video out of a plurality of videos stored in the video storing unit 120 in order to give the viewer the proper emotion. For example, if the user is horrified or mad during a comedy, the video selection device 106 will change the plot line to adjust the video in order to give the viewer the perceived proper emotion. The change in video by the video selection device 106 occurs at a predetermined time (e.g., at ten minutes, then every five minutes thereafter, etc.) or can be dynamically changed based on the mood of the viewer such that the viewer is always satisfied.

The video generation device 107 receives the selected video from the video selection device 106 and outputs the video to the display unit 130 for viewing by the user such that additional user information 150 can be collected.

In an exemplary embodiment, a viewer is watching a short episode of a weekly TV comedy series that happens thirty minutes every Wednesday evening. The series content scheduled for this week has a fixed opening of ten minutes based on which the initial user information 150 is determined. Following the opening ten-minute video, two consecutive flexible slots of five minutes each are available to be selected by the video selection device based on the user's emotions determined by the biometric analyzing device 101, the viewer content analyzing device 102, the expression analyzing device 103, and the text analyzing device 104. Finally a fixed closing of 10 more minutes is provided after the two five minute flexible slots.

There is an opportunity to optimize a viewer's happiness in the two flexible slots and also for marketing to the user since the second one of the two flexible slots can been marked such that it can even be used for soft-selling a product sponsored by an advertiser.

At the later part of the first ten-minute video, the biometric analyzing device 101, the viewer content analyzing device 102, the expression analyzing device 103, and the text analyzing device 104 collectively determine that the viewer is frustrated with the series (i.e., instead of amused). For example, the viewer did not like the loud man who is always talking, and the viewer also did not like the old aunty of the hero who is always whining. Further, the expression analyzing device 103 determined that the viewers face looks annoyed.

The viewer writes his feelings on his Twitter™ as well as starts glancing through a travel blog post to a Hawaii beach that his friend has Tweeted™ about, looking at the display unit absent-mindedly and missing some later parts of the first ten minutes of the series.

The viewer content analyzing device 102 analyzes the Twitter™ text and the text analyzing device 104 analyzes the text that the viewer is reading. Before the first ten minute segment ends, the video selection device 106 identifies what is the best video that can be shown to the viewer in the first flexible slot of five minutes, from the available alternatives in the video storing unit 120.

Using the tags that have been made available by the video maker, the video selection device 106 detects that there is a version in which the loud man is absent, there is another version in which the whining aunty is absent, and there is a version in which both are present. Hence, the viewer can only be partly satisfied.

The video selection device 106 further detects that, in the version that has the loud man as well as the version that has both (i.e., the loud man and the whining aunty), there is also a sea beach tagged, as well as, a soft drink flavor tagged, and these are missing from the version that has the whining aunty The video selection device 106 therefore selects the loud man only version of the video for the first slot of five flexible minutes and outputs the video to the display unit 130 in which the viewer will watch and generate additional user information 150.

Over from the eleventh minute to the fourteenth minute of the first flexible video, the devices of the video personalizing system 100 observe that the viewer is paying more attention to the display unit 130, and has a smile on their face. The viewer has stopped reading the travel blog post.

The viewer also composed a Tweet™ on the thirteenth minute, talking about the relief that that the viewer has had by elimination of the whining aunty, and a wish that the loud man was not there, but glad that the hero and the heroine have gone to the sea beach and near the soft drink shop, where the loud man was keeping a bit more quiet.

Based on the above outputs from the biometric analyzing device 101, the viewer content analyzing device 102, the expression analyzing device 103, and the text analyzing device 104, the video selection device 106 decides between two options of a video tagged without the loud man, in an indoor scene with the hero and the heroine and another one of a continuation of the beach scene where the loud man, hero and heroine are present and enjoying a soft drink for most of it.

Since the second option has a commercial possibility (i.e., a marketing factor) and the viewers' degree of enjoyment is increased, the second option is selected by the video selection device 106 and delivered for the second slot of five flexible minutes. The marketing factor can be determined by at least one of viewer generated content and the text that the viewer reads. Also, the marketing factor can be based on any user information 150 which may satisfy the user.

At the end of this five minutes, the final ten minutes with a fixed single pre-selected video is displayed.

Figure 2:
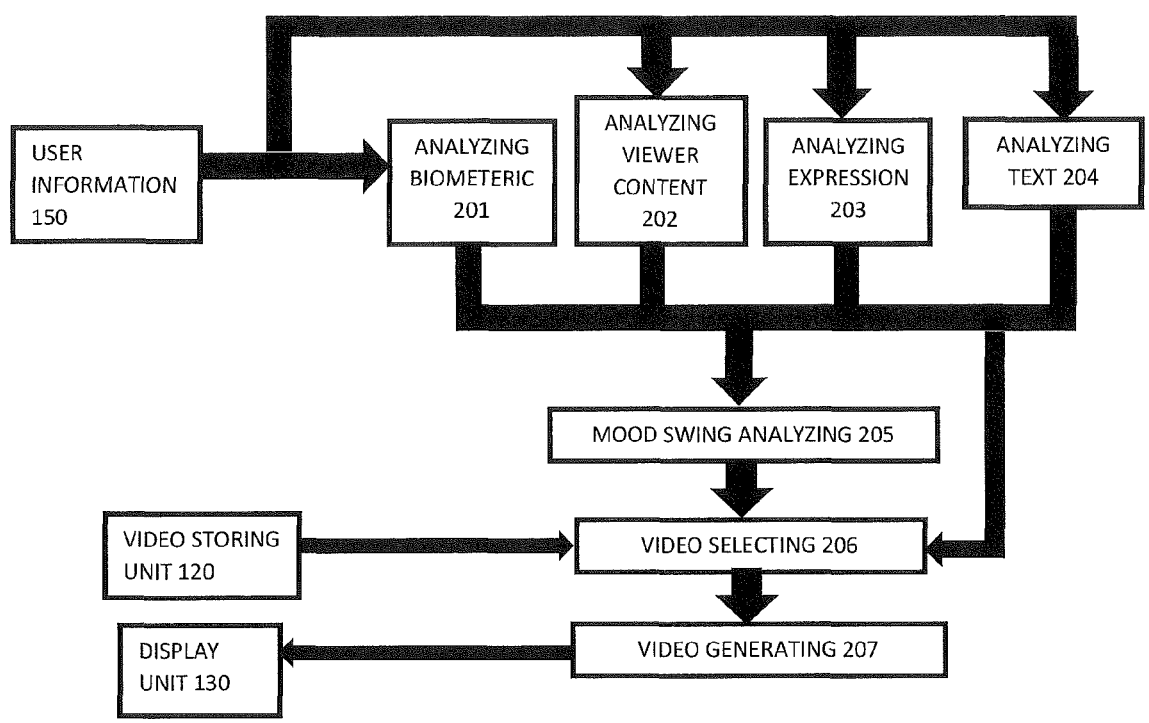
FIG. 2 exemplarily shows a high level flow chart for a video personalizing method.

FIG. 2 shows a high level flow chart for a method 200 of video personalizing.

Step 201 analyzes the user information 150 for the viewer's focus levels, facial reactions and mood swings while watching a video, as detected by the TV set/set top box/video watching device and wearables such as rings, watches and glasses.

Step 202 analyzes the user information 150 of the online content generated by the viewer of a given initial video clip in parallel to watching the video on the display unit 130 while the viewer watches the current video.

Step 203 analyzes the user information 150 for the viewer's facial and eye-related reaction to the initial video clip, the content consumed and the content produced.

Step 204 analyzes the user information 150 for the text that the viewer reads or elated content online via her smart phone, tablet, and computer etc., then step 204 infers the user's positive and negative reactions from eye movements and facial expressions, and matching that with the nature of the content that the user is reading.

Thus, Step 201, Step 202, Step 203, and Step 204 collectively monitor viewer reaction and perception to a given video, over time, for purpose of adapting or personalizing the video as it moves forward.

Step 205 receives all of the outputs from Steps 201 to 204 and analyzes the change in mood of the viewer over time. For example, the user can initially be happy during a first period of a first clip and then change to being mad by an end of the first clip. The mood swing analyzing 205 tracks the changes in mood of the viewer.

Step 206 determines the genre/labels/mood associated with the set of content (i.e., associated with the video) with the most favorable user reaction. For example, Step 206 determines if the video is a comedy, a horror film, or a contest show and associates a reaction of happy, scared, or entertained, respectively as the type of reaction that a user should have with that video.

Then, based on the collective output of Steps 201 to 204, Step 206 selects a video out of a plurality of videos stored in the video storing unit 120 in order to give the viewer the proper emotion. For example, if the user is horrified or mad during a comedy, Step 206 will change the plot line to adjust the video in order to give the viewer the proper emotion (i.e., happy and laughing). The change in video by the video selection device 106 occurs at a predetermined time (e.g., at ten minutes, then every five minutes thereafter) or dynamically based on the mood of the viewer such that the viewer is always satisfied.

Step 207 receives the selected video from Step 206 and outputs the video to the display unit 130 for viewing by the user such that additional user information 150 can be collected.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the video personalizing system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A video personalizing system receiving user information for a viewer watching a first video, comprising:
   a biometric analyzing device configured to analyze the user information for biometric data;
   a viewer content analyzing device configured to analyze the user information for online content generated by the viewer in parallel to watching the first video;
   an expression analyzing device configured to analyze the user information for facial and eye reactions of the viewer;
   a text analyzing device configured to analyze the user information for text that the viewer reads; and
   a video selection device configured to select a second video out of a plurality of videos stored in a video storing unit in order to increase a satisfaction of the viewer based on collective outputs of the biometric analyzing device, the viewer content analyzing device, the expression analyzing device, and the text analyzing device;
   a mood swing analyzing device configured to determine a change in a mood of the viewer based on a first mood at an end of the first video and a second mood at an end of the second video,
   wherein the detected second mood is compared with an intended second mood for the second video to increase the satisfaction of the viewer and the video selection device re-configures a correlation between the intended second mood of videos in the video storing unit based on the collective outputs of the biometric analyzing device, the viewer content analyzing device, the expression analyzing device, and the text analyzing device when the intended second mood for the second video is different than the detected second mood.

2. The system of claim 1, wherein the user information used by the biometric analyzing device, the viewer content analyzing device, the expression analyzing device, and the text analyzing device is based on a current video of the plurality of videos that the viewer is viewing.

3. The system of claim 1, wherein the text analyzing device determines positive and negative reactions of the viewer from eye movements and facial expressions related to the viewed text, and matches the positive and negative reactions with a nature of the content.

4. The system of claim 1, wherein the video selection device is further configured to determine at least one of a genre, a label, and a mood associated with each of the plurality of videos.

5. The system of claim 1, wherein the mood swing analyzing device is further configured to analyze the user information to determine the change in the mood of the viewer over time based on the collective outputs of the biometric analyzing device, the viewer content analyzing device, the expression analyzing device, and the text analyzing device.

6. The system of claim 1, wherein the biometric data is calculated by a wearable device of the viewer.

7. The system of claim 1, wherein the video selection device selects the second video based on a marketing factor of the second video.

8. The system of claim 1, wherein the video selection device selects the second video only based on a marketing factor of the second video, and
   wherein the marketing factor is determined by at least one of viewer-generated content and the text that the viewer reads.

9. The system of claim 1, wherein the viewer content analyzing device analyzes the viewer-generated content to determine a satisfaction level of the user, the satisfaction level being based on the viewer-generated content relative to expected generated content in relation to each video of the plurality of videos.

10. The system of claim 1, wherein the text analyzing device further analyzes a reaction of the viewer based on the text that the viewer reads.

11. The system of claim 1, wherein each of the plurality of videos includes instantiating videos from templates in real-time.

12. A non-transitory computer-readable recording medium recording a video personalizing program receiving user information for a viewer watching a first video, the program causing a computer to perform:
   analyzing the user information for biometric data;
   analyzing the user information for online content generated by the viewer in parallel to watching the first video;
   analyzing the user information for facial and eye reactions of the viewer;
   analyzing the user information for text that the viewer reads;
   selecting a second video out of a plurality of videos stored in a video storing unit in order to increase a satisfaction of the viewer based on collective outputs of each of the analyzing; and
   determining a change in a mood of the viewer based on a first mood at an end of the first video and a second mood at an end of the second video,
   wherein the detected second mood is compared with an intended second mood for the second video to increase the satisfaction of the viewer and a correlation between the intended second mood of videos in the video storing unit is reconfigured based on the collective outputs of each of the analyzing when the intended second mood for the second video is different than the detected second mood.

13. The non-transitory computer-readable recording medium of claim 12, wherein the user information used by each of the analyzing is based on a current video of the plurality of videos that the viewer is viewing.

14. The non-transitory computer-readable recording medium of claim 12, wherein the analyzing the user information for text determines positive and negative reactions of the viewer from eye movements and facial expressions related to the viewed text, and matches the positive and negative reactions with a nature of the content.

15. The non-transitory computer-readable recording medium of claim 12, wherein the selecting determines at least one of a genre, a label, and a mood associated with each of the plurality of videos.

16. A video personalizing method receiving user information for a viewer watching a first video, the method comprising:
   analyzing the user information for biometric data;
   analyzing the user information for online content generated by the viewer in parallel to watching the first video;
   analyzing the user information for facial and eye reactions of the viewer;
   analyzing the user information for text that the viewer reads;
   selecting a second video out of a plurality of videos stored in a video storing unit in order to increase a satisfaction of the viewer based on collective outputs of each of the analyzing; and
   determining a change in a mood of the viewer based on a first mood at an end of the first video and a second mood at an end of the second video,
   wherein the detected second mood is compared with an intended second mood for the second video to increase the satisfaction of the viewer and a correlation between the intended second mood of videos in the video storing unit is reconfigured based on the collective outputs of each of the analyzing when the intended second mood for the second video is different than the detected second mood.

17. The method of claim 16, wherein the user information used by each of the analyzing is based on a current video of the plurality of videos that the viewer is viewing.

18. The method of claim 16, wherein the analyzing the user information for text determines positive and negative reactions of the viewer from eye movements and facial expressions related to the viewed text, and matches the positive and negative reactions with a nature of the content.

19. The method of claim 16, further comprising analyzing the user information to determine a change in a mood of the viewer over time based on the collective outputs of each of the analyzing.

\* \* \* \* \*